Dec. 28, 1948.  C. WOLF ET AL  2,457,424
ROLLER WHEEL
Filed Oct. 17, 1945
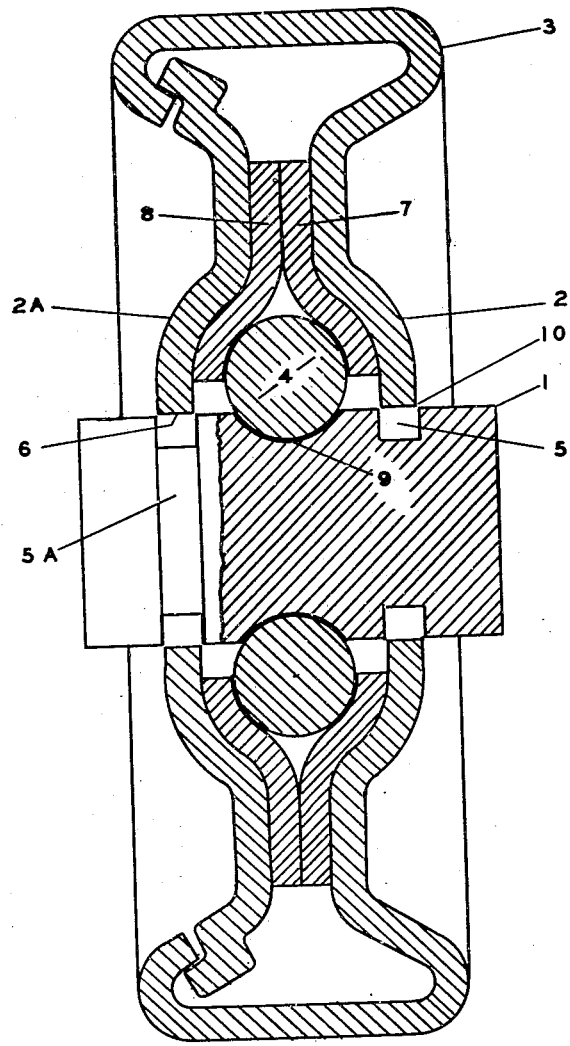
INVENTORS
CECIL WOLF &
NEIL M. FOULDS
BY
ATTORNEY Patented Dec. 28, 1948

2,457,424

UNITED STATES PATENT OFFICE 2,457,424

ROLLER WHEEL

Cecil Wolf, Rock Falls, and Neil M. Foulds, Sterling, Ill., assignors of one-half to The Rapids-Standard Company, Inc., Grand Rapids, Mich., a corporation of Michigan, and one-half to Frantz Manufacturing Company, Sterling, Ill., a corporation of Illinois Application October 17, 1945, Serial No. 622,802

2 Claims. (Cl. 301—5.7)

1

This invention refers to a ball bearing supported wheel and particularly to a type thereof which is shielded against the entry of dirt into the region of the balls and ball races.

In the manufacture of ball bearing supported wheels for a variety of purposes, such as dolly casters, conveyor roller beds, or roller skates, it has for a long time been desirable to protect the bearing balls and the ball races from the entry of foreign particles such as dirt or dust, but to do so without increasing unduly the cost of the finished product. A number of attempts in this direction have provided a flange extending radially from the axle of the wheel on one or both sides of its disk. This works effectively but is expensive to construct in that it either necessitates fastening a separate piece in some manner to the wheel axle or requires that the axle start as a piece of relatively large diameter and be turned down. This latter entails both a waste of material, extra time and an extra step in handling.

Accordingly, it has been desirable to discover means for preventing or hindering the entry of foreign material into the interior of the wheel bearing, which means will entail a minimum of additional expense in the manufacture of the wheel.

After a large amount of experimentation, we have discovered that this may be accomplished by the simple provision of a groove in the wheel axle adjacent to the wheel disk. This requires only a simple machining operation to secure and does not require the reduction in diameter of a considerable part of the wheel axle.

Accordingly, the principal object of our invention has been to provide means for substantially hindering the entry of foreign materials such as dirt, dust, sand, and metal particles into the bearing of a caster or roller wheel.

A further object of our invention has been to provide means as aforesaid which will entail only a minimum of expense to provide.

A further object of our invention is to provide means as aforesaid which can be provided in the present roller wheels of standard pattern without material alteration of the manufacturing procedure.

In the drawings there is shown a partially broken view mostly in central section, of a standard roller wheel having our improvement applied thereto.

Referring to the drawing, there is shown a cylindrical axle 1 around which is located the disks 2 and 2a of usual construction surrounded by the flange or wearing surface 3. Within the wheel are the conventional bearing guide members 7 and 8 which, by cooperating with a bearing race 9 on the axle, supports and guides a plurality of ball bearings 4.

The diameter of the opening 10 through each of the disks 2 and 2a is made of diameter only a few thousandths of an inch, such as 0.002 inch, greater than the diameter of the axle in order that the disks 2 and 2a may be put in place as shown in the drawings over the ends of the axle 1, but the clearance is made sufficient only for sliding passage of one by the other and is not a running clearance.

There is provided in the axle 1 a pair of circumferential grooves 5 and 5a which are located immediately opposite the walls 6 of the opening 10 of each of the disks. This groove serves as a trap for the arresting of whatever dirt or other foreign material might otherwise work along the surface of the axle into the bearing mechanism. This groove is slightly wider than the thickness of the disks to assure that there will be ample running clearance between the disks and the axle even though the openings 10 in the disks afford only a sliding clearance with the axle at points thereon other than of the grooves.

It will be observed that this groove provides a chamber having relatively large volume with respect to the opening into the chamber and the opening out from said chamber. Thus, the chamber is not only somewhat shielded from the free entry of dirt thereinto but its exit is also of limited extent as compared to the total area of the chamber walls. Because of this, dirt enters only with some difficulty and, of that which does enter, only a very small amount will find its way out of the exit and into the bearings.

It will be observed that in providing this type of dirt trap it is not necessary to reduce the diameter of a major part of the axle and the wastage of material and labor time incident to starting with an oversized piece of stock is avoided. The assembly procedure for this type of wheel is unchanged from that of conventional wheels and the provision of the grooves 5 and 5a is a simple step which may be easily and cheaply made.

Accordingly, we have disclosed and described a dirt arresting means for roller wheel construction which will meet the objects and purposes above outlined.

We claim:

1. In roller wheel construction the combination: an axle having a raceway for bearing balls thereon; a pair of wheel disks surrounding said axle and means holding said disks affixed to each other; means held between said wheel disks providing an outer bearing raceway and a plurality of bearing balls located in said raceway; a wheel flange mounted on and circumferentially surrounding said disks; a dirt arresting groove having substantially rectangular cross section circumferentially surrounding said axle and located thereon substantially in alignment with each of the said disks and slightly wider longitudinally of the axle than the corresponding thickness of the said disk, the axle receiving opening in said disk providing a close sliding fit with respect to said axle.

2. In a roller wheel having an axle having a raceway for bearing balls thereon; a pair of wheel disks surrounding said axle and the means holding said disks affixed to each other; means held between said wheel disks providing an outer bearing raceway and a plurality of bearing balls located in said raceway; a wheel flange mounted on and circumferentially surrounding said disks; the improvement comprising: a pair of circumferential annular grooves in said axle each being located therein in substantial alignment longitudinally of said axle with one of said disks and slightly wider longitudinally of the axle than the corresponding thickness of the said disk.

CECIL WOLF.
NEIL M. FOULDS.

REFERENCES CITED

The following references are of record in the file of this patent:

UNITED STATES PATENTS

| Number | Name | Date |
|---|---|---|
| 705,863 | Porter | July 29, 1902 |
| 2,110,864 | Batesole | Mar. 15, 1938 |
| 2,127,149 | Whitney et al. | Aug. 16, 1938 |